(12) United States Patent
Chien

(10) Patent No.: US 9,970,608 B2
(45) Date of Patent: May 15, 2018

(54) LIGHT DEVICE HAS BUILT-IN DIGITAL DATA SYSTEM FOR RECORD IMAGE, SOUND

(71) Applicant: Tseng-Lu Chien, Walnut, CA (US)

(72) Inventor: Tseng-Lu Chien, Walnut, CA (US)

(\*) Notice: Subject to any disclaimer, the term of this patent is extended or adjusted under 35 U.S.C. 154(b) by 0 days. days.

(21) Appl. No.: 15/689,381

(22) Filed: Aug. 29, 2017

(65) Prior Publication Data
US 2017/0363262 A1    Dec. 21, 2017

Related U.S. Application Data

(63) Continuation-in-part of application No. 14/728,369, filed on Jun. 2, 2015, now Pat. No. 9,787,885, which is a continuation-in-part of application No. 14/265,838, filed on Apr. 30, 2014, now Pat. No. 9,197,865, which is a continuation-in-part of application No. 13/295,301, filed on Nov. 14, 2011, now Pat. No. 8,760,514.

(51) Int. Cl.
| | |
|---|---|
| *H04N 7/18* | (2006.01) |
| *F21S 8/00* | (2006.01) |
| *F21V 21/092* | (2006.01) |
| *H04N 5/225* | (2006.01) |
| *F21S 2/00* | (2016.01) |
| *G01S 3/786* | (2006.01) |
| *F21S 9/02* | (2006.01) |
| *F21V 9/08* | (2018.01) |

(52) U.S. Cl.
CPC .......... *F21S 8/035* (2013.01); *F21V 21/0925* (2013.01); *H04N 5/2252* (2013.01); *F21S 2/005* (2013.01); *F21S 9/022* (2013.01); *F21V 9/083* (2013.01); *G01S 3/7864* (2013.01)

(58) Field of Classification Search
CPC .......... G08B 13/19619; G08B 13/1963; G08B 13/19632
USPC ................................. 348/142–160
See application file for complete search history.

*Primary Examiner* — Andy Rao
(74) *Attorney, Agent, or Firm* — Bacon & Thomas, PLLC

(57) ABSTRACT

A Light device having built-in digital data means is powered by an unlimited power source for a lamp-holder, LED bulb, or light device connected to unlimited power source by prongs or a base that or conductive wires can be inserted into a socket that would otherwise receiving a bulb. The device may take the form of a web cam having auto tracking added one of plurality functions to make different products and functions and retractable prongs that plug directly into a wall outlet or insert into existing lamp base or incorporate conductive wire to make electric connection at least one of built-in camera, storage unit, wireless kits, Bluetooth kits, motion sensor, light device.

20 Claims, 11 Drawing Sheets

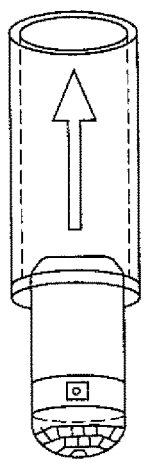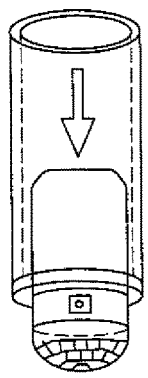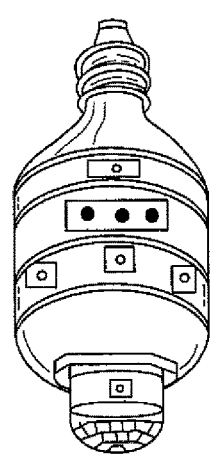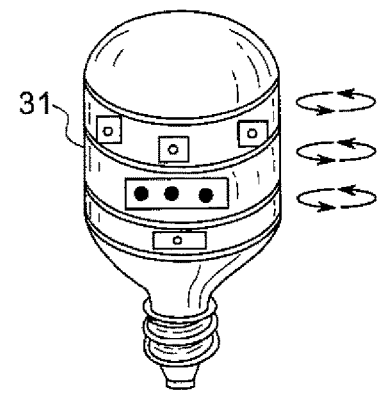
Fig. 3A　　　Fig. 3B　　　Fig. 4A
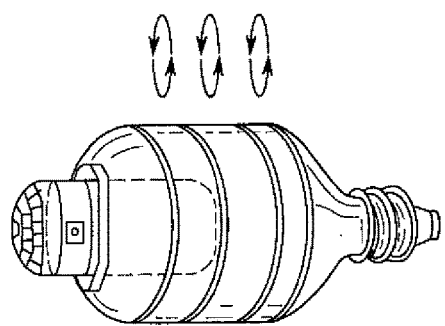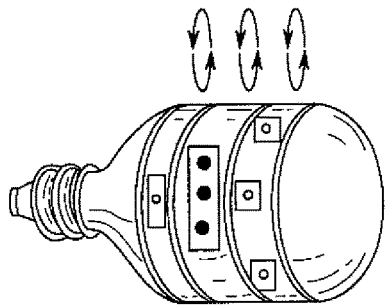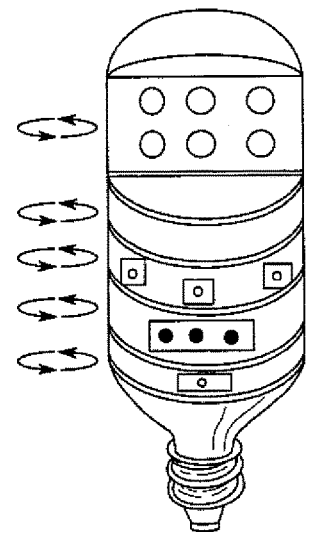
Fig. 3C
Fig. 4C　　　Fig. 4B

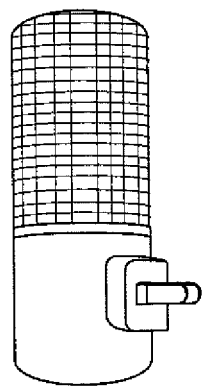 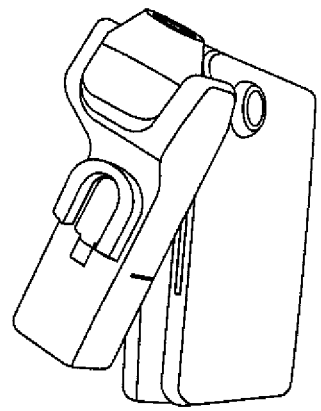
Fig. 9A　　　　　　　Fig. 9B
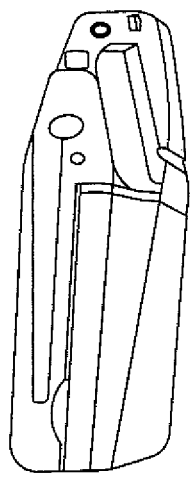 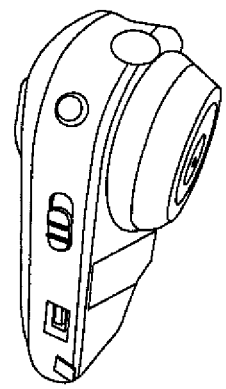
Fig. 9C　　　　　　　Fig. 9D
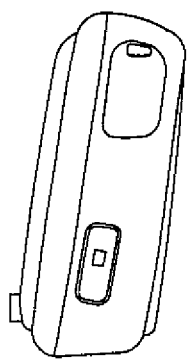 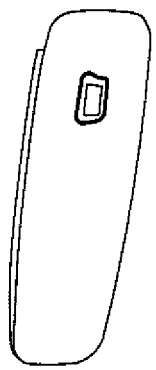
Fig. 9E　　　　　　　Fig. 9F

LIGHT DEVICE HAS BUILT-IN DIGITAL DATA SYSTEM FOR RECORD IMAGE, SOUND This application is a continuation-in-part of U.S. patent application Ser. No. 14/265,838, filed Apr. 30, 2014, which is a continuation-in-part of U.S. patent application Ser. No. 13/295,301, filed Nov. 15, 2011, now U.S. Pat. No. 8,760,514, each of which is incorporated herein by reference.

BACKGROUND OF THE INVENTION

This application has subject matter in common with the inventor's U.S. patent application Ser. Nos. 12/624,621, 12/622,100, 12/318,471, 12/318,470, 12/318,473, 12/292,153, 12/232,505, 12/232,035, 12/149,963, 12/149,964, 12/073,095, 12/073,889, 12/007,076, 12/003,691, 12/003,809, 11/806,711, 11/806,285, 11/806,284, 11/566,322, 11/527,628, 11,527,629, 11/498,874, 12/545,992, 12/806,711, 12/806,285, 12/806,284, 12/566,322, 12/527,628, 12/527,629, 12/527,631, 12/502,661, 11/498,881, 11/255,981, 11/184,771, 11/152,063, 11/094,215, 11/092,742, 11/092,741, 11/094,215, 11/094,156, 11/094,155, 10/954,189, 10/902,123, 10/883,719, 10/883,747, 10/341,519, 12/545,992, 12/292,580, 12/710,918, 12/624,621, 12/622,000, 12/318,471, 12/318,470, 12/318,473, 12/292,153, 12/710,561, 12/710,918, 12/711,456, 12/771,003, and Ser. No. 12/951,501.

Of particular relevance are the inventor's U.S. patent application Ser. No. 13/296,469, filed on Nov. 15, 2011, and directed to a device having built-in digital data means and powered by a power source for a lamp holder, and Ser. No. 13/295,301, also filed on Nov. 15, 2011 and directed to a device having built-in digital data means and powered by a power source for an LED Bulb. Also of particular relevance are the inventor's U.S. patent application Ser. No. 11/806,285, which discloses an LED night light having multiple functions, and Ser. No. 12/951,501, which discloses a lamp holder having a built-in LED light.

The current invention involves an LED light, which may be in the form of a night light, bulb, lamp holder, or other light source or LED illumination device, and which has built-in digital device(s) with digital data record, storage, and wireless communication or display functions for digital sound, messages, photos, movies, films, audio, video, etc.

Current home security products available in the marketplace, and especially wireless home security products, are very expensive. Furthermore, not only are they too costly, they are also too much trouble to install (may need engineer to help) and some application need use outside control box with complicated setting which is not easily for youth or aged peoples. the batteries or power storage means must be replaced very often.

To solve the problem of frequent battery or storage means replacement, the current invention utilizes an power source provided by an alternating current (AC) electrical outlet into which built-in prong means are plugged or to which a screw-in base is connected, and/or includes circuit means converting the AC power to direct current (DC) power.

In addition, the current invention incorporates a low cost, super compact Digital Video (DV) device (hereafter as DV) or same function products available at market place such as (webcam) or (drivingCam) or (Go-Pro), which is built-into the said light device and preferred the camera is tiny head with tiny size so like hidden-camera built-in the said light device so bad man can not easily find while get into people house so can solve the problems of high cost and difficult installation, eliminating the need to hire professional engineers at high cost per hours and saving wasted time in waiting for an installation appointment and never-understand setting procedures. The current invention can transmit digital data from the digital camera to the display unit while receiving power directly from built-in prong means in the DV camera or from a screw-in base or other conductive skills to connected with an AC power source with circuit means to provide DC power.

The current invention preferably also provides (1) Low-cost model: a DV device having a camera and display screen in one unit so that there is no need to spend cost for transmission by wireless means for most economical model for variety of low-income person. All digital data got form camera can store within the memory unit such as SD or Micro-SD card and can show image while take it out and connect with display software. Or (2) the preferred update model can use blue-tooth to download the digital data storage inside the memory unit such as SD card or Micro-SD card or other data storage kits. Or (3) It also can use rounder or Wifi wireless kits to build the communication for built-in camera, storage unit, email, dial phone, transmit the digital data to desired consumer, computer, communication devices including phone, laptop, display screen . . . etc for high-end products who willing to pay for. However, all these applications all the selected parts from camera, storage units, blue-tooth, wireless transmitting, SIM card, circuit, controller, motion sensor, camera, webcam, driving-Cam, IP-Cam or equal function or replaced parts or accessories still fall within the current invention scope. The current invention mainly to design for light device has different parts built-in on the said light device for low-end, middle cost, high-end cost version for different functions and parts.

(2) The simple functions as below listed;

(1) digital data storage into memory card, when needed take inside memory card or SD card or Micro SD card to display device to check digital data.

(2) digital data can download into communication device(s) by Bluetooth communication into phone, computer, display device, laptop, monitor.

(3) Digital data can use wireless communication assembly to send out message, data, alert, words, sound, image to variety of communication devices including mobile phone, computer, monitor or can multiple ways communication through wireless network, 3G or 4G or update wireless network, WIFI, Router, wireless net work or internet equivalent or same function wireless network.

Because the DV camera is built into the light device, and may including an LED light, LED bulb, lamp holder, or other light source or the LED illumination device, the invention offers excellent home security for low-end, middle-end, high-end with simple installation. One advantage is that a bad man into and cannot easily find the preferred hidden-installation the said DV camera from among a variety of lighting related device(s) such as lamp holders, LED bulb or light device on the wall or ceiling, and all the bad man's behavior been detected and recorded inside the built-in DV camera and storage unit so this will offering the best safety record to protect home and family at any time. The storage unit's inside digital data can get by (1) Get SD or Micro-SD card to connect with display software (2) Incorporate with Blue tooth communication to download the storage unit's digital data (3) Incorporate with Wife or rounder's wireless communication to transmit to digital device including phone, computer, laptop, display, monitor . . . etc. Further more, every electric components for circuit, blue-tooth, wifi, rounder and related APP communication parts & accessories all built-into the said light device, LED bulb or lamp holder or lamp socket adaptors as current invention, parent filing or co-pending filing case disclosure. It is appreciated all the above listed current, parent, co-pending filing still fall within the current invention scope.

In a preferred embodiment of the current invention, the DV camera can include an endless recording that overwrites past digital data so that it will always update new data without the need to change any storage means, so long as the initial installation is selected for certain hours of recording and certain minutes for the storage section.

The preferred DV device may have the most advanced technical features and functions available from the marketplace, which may include any combination of a (F1) wide Angle or telescope lens assembly and fine pixel/HD (1280.times.720 Pixel)/VGA (720.times.480 pixels)/good display screen (320.times.240 pixels) with a light weight, rechargeable batteries, and anywhere from 1.3M up to 12M or more pixels to provide VGS or HD video or ISO selection;

(F2) auto focus/tilt/rotating/moving/scan functions;

(F3) a motion sensor by PIR means;

(F4) a motion sensor by screen detection;

(F5) a night vision selection (IR or equivalent or same or replaceable device);

(F6) auto power shut-off;

(F7) power saving;

(F8) built-in screen;

(F9) USB means for data delivery;

(F10) remote control means;

(F11) wireless data transfer to a remote cellular home/computer/communication device(s) including remote controller, Bluetooth, Wifi, router, wireless transmitter and receiver device or wireless communication including wifi, 3G, 4G or future available for wireless equipment. The wireless communication including mutual ends communication, software setting, hardware or software communication.

(F12) auto dialing to a police station or send emails or send line-message;

(F13) auto tracking of moving object(s) from ants to elephants or other live objects;

(F14) other light means/device(s);

(F15) other wireless/remote/IR sensor/PIR sensor/motor(s) features;

(F16) any other electric or mechanical functions available from the marketplace for a digital camera or digital video recorder. Any or all such features may be selected and incorporated with the preferred DV device to make sure people can see, know, and watch the desired site/events at any location/place/time.

The DV device may have a plurality of cameras to provide multiple images that can be shown on a screen so as to monitor multiple areas. It will also be appreciated that the DV device can incorporate an IC chip and related circuitry, motor-means, and a motion-sensor with more than one sensor heads to allow a single camera head with auto tracking functions to follow moving objects.

A preferred embodiment of the built-in DV device of the current invention includes an LED bulb and lamp holder or variety of lighting device to provide an LED light device, night light, or security light which has prong-means or socket-means or conductive wire to connect to an unlimited power source or big capacity energy storage unit which directly supplies current, or to a rechargeable big capacity power storage-means such as a rechargeable battery, and which also may incorporate with any other separate means such as wire(s), adaptor(s), or transformer(s) to deliver electricity from the unlimited power or big electricity storage unit source to the LED device and built-in digital data device.

Furthermore, the unlimited power source (outdoor application) or big electricity capacity storage unit (indoor battery operated application) may use prong means, a socket base lamp holder, and conductive means, or a USB-cable that directly comes out of the device housing, or a regular 120 Volt 60 Hz plug wire that directly comes out of the device housing and connects with the public electricity system for home, house, and public areas. The electric delivery from device to AC or DC power source may select from convention market for all kind of skill and method and kits. One of the best applications for the current invention is as a webcam that already used for all kinds of computer, laptop, phone, or communication equipment. Or driving-Cam already use for all moving traffic device. Both are not expensive like the street police department use Traffic-Cam. Conventional webcams are limited in that they cannot follow moving people or objects so people have to sit in front of the webcam to talk with people. Further more, (solve 1)

The webcam lack of the brightness during the night time so can not have good photos, image to be seen at dark or night time environment.

Solve 2

As for convention security light such as health Zenith® motion sensor LED or PAR38 bulb or halogen for outdoor security light device lack of the camera, storage unit, memory card, Bluetooth, WIFI, Router communication so all heath Zenith® products just a Motion sensore light device lack of function to take photo, image, sound, movement recording and replay function, so it is not really to keep people has good security and prevent bad man to do bad things.

Solve 3

The current invention preferred all the motion sensor products such as the motion sensor lamp holder as FIG. 1A, 1B, 1C, 2A, 2B add the DV & memory card so it will add only limited cost but become motion sensor security products as other issued U.S. Pat. No. 8,562,158, U.S. Pat. No. 9,010, 986. Or for the LED bulb may has motion sensor and built-in the DV cam & memory card and other optional wireless kits as U.S. Pat. No. 8,711,216. So to add the DV & memory card with optional different combination for Bluetooth, WIFI, Router transmitting or receiving kits built-into light related products including LED bulb, lamp holder, lamp holder adaptor, Light device which the said all related for offering the brightness for dark or night time illumination so can make the DV or WebCam or IP Cam or DringCam can has sufficient brightness to take full color photo, clear video into memory cards or memory unit. This also overcome the some Night Vision design to use the IR or photo diode to makeup the dim or dark brightness but such design normally make the photos or video only become BLACK and WHITE with not-clear photos or image. So Add the DV and related parts & accessories as above discuss or parent, co-pending, patented is the best combination than other IR night vision design. This is main reason, the current invention prefer to incorporated with existing light device has built-in camera, memory unit, and optional wireless communication combinations as desired functions and cost.
Solve 4
The other problem for IR night vision is not prefect than use existing light device to offer brightness for dark environment or night time to take photos or video→ The IR night vision has major problem for Power consumption and have high heat problem and distance range too short issues and finally is expensive cost issues.
To add only the camera and memory units into existing all kind of light source light device has no such issues. So, the current invention preferred to add camera and memory unit and optional wireless transmitting & receiving kits is the best combination.
Also, There is no need to make one new security camera with memory unit with optional wireless device. Because majority house, home, public building had all kind of existing lighting such as outdoor motion sensor security light, door entry motion sensor light, motion sensor night light, motion sensor anywhere light which can have plug-in or battery or wired or outside transformer or outside adaptor or other power storage unit to supply the sufficient unlimited power source to make all kind of light source light device for motion activated light device.
Solve 5
The current invention such as FIG. 3A, 3B, 3C and FIG. 4A, 4B, 4C the LED bulb as normal market LED bulb built-in the camera and memory unit with optional wireless communication kits. The preferred the camera is so tiny diameter for lens so it become almost called "hidden camera" or "pin-hole" camera so not easily to be found by bad man while interrupted into home, house, building whild do the bad things.
Same as applications for Lamp holder, lamp holder adaptor, all kind of lighting as list on this invention. The preferred the camera is belong to hidden-camera or pin-hole camera so not let people easily find the location of the security camera and destroy it. This is other feature for the current invention to overcome market camera location been notice and destroy by bad man.
Solve 6
From FIG. (8A)(8B) show the portable Flash light has built-in DV, memory unit, and optional wireless communication such as WiFI, 3G or 4G or future wireless transmitter or receiving kits to offer the police or army or military or security person can have the super bright light source to incorporated built-in DV and memory unit and optional wireless communication to take photos, take video, offer on-line image through the optional wireless communication to the viewers to see the record or on-line or on-air instat live image to make sure the safety and status while people use the flash light. While use for Army or Military purpose the DV or Camera can incorporate with above discussion for night time or dark environment to use the (1) Visible flash light beam to offer brightness or (2) unvisible IR or photo diode to make the dim or dark environment to show the surrounding status and not let enemy see the Visible light beam and shoot the army or military team and persons.

The flash light offer super good brightness let the DV or camera or IP Cam or driving Cam or WebCam can take nice photos, video, on-line message with colorful image to viewer.
Same for other lighting device did as above discussion. This is offer the portable flashing light or wearable flashlight for people to report or send out image by wireless communication equipment to the phone, computer, screen, communication equipment to report the people status or environment at the dark or evening environment.
This is unique and the power can be DC power source or rechargeable Power source or wireless recharge power source by market available charging or battery storage units with sufficient big capacity of the electricity.
Solve 7
The current invention for light device has communication assembly which have multiple-ways communication functions while incorporate with related or update software such as APP so can increase function including (a) talk through the security light (b) control the camera angle, position, focus, orientation, setting, adjust details (c) send out email, alert, words, talk, chat, dial to police station, connect with government utility service through the existing wife, router, internet, wireless network, 3G or 4G or future wireless network so can check all areas or locations status at any time though the wireless communication assembly or kits or device which built-in on the said security light to make the all digital data can be communication.
The current invention make the combination for the non-expensive and compact size of the WebCam or DV or DrivingCam with the light device so solve the all above list issues and most important are (1) lack of brightness to take good photos at the dark environment (2) Add the camera, memory means, power storage unit, wireless transmitter & receiver, Bluetooth, WIFI, Rounder, motion sensor.
Also, The embodiment of the current invention that provides a USB-cabled light device with a camera head having an auto tracking assembly will make an excellent auto-tracking webcam to let people freely move while talking with other parties.

Another preferred feature is to include foldable or retractable prongs so that the device can be carried anywhere such as Night light or night light USB charger products has built-in hidden camera assembly. The current invention may have different constructions that provide an LED night light with a built-in digital data device capable of being moved and used anywhere, including a car, motorcycle, boat, bus, truck, or other transportation equipment available in the marketplace so long as the foldable or push-in/push-out prong-means is incorporated with a proper receiving-means and adaptor-means to connect with a transportation cigarette lighter or USB-port device.

Furthermore, the DV may have a variety of functions, parts, and accessories to get desired functions. The DV device parts and accessories may be selected from different camera heads, kits, lenses, optics means, Lens assembly, night vision means, means for detecting motion by image screen or motion sensor, vibration sensors, sound sensors, storage means, SD cards, Micro-SD cards, memory sticks, memory means, operation functions, power saving circuits, screen touch panels, exposure means, and/or motor means, as well as means for adjusting or selecting clearance, pixels, sharpness, ASA, and so forth.

Another preferred embodiment of the DV device of the current invention is to add the DV device to a lamp holder and LED bulb. A majority of Varity light source lights and lamp holders are installed at a position which is higher than people's height, so that they will easily record moving objects without any objects blocking the camera shooting directions. Furthermore, the current invention not only can provide an LED bulb or lamp holder with a DV, but also for all kind of market available variety of light source light device including a night light that incorporates a wider angle camera lens so that it can look for moving objects from an unnoticeable position. The current invention also can apply more than one camera head with a divided image on screen to save cost or use only one camera head that incorporates more than one sensor-means and an IC circuit to calculate a position or orientation difference to delivery electric signals to a motor-means to move the camera head toward a moving object and thereby provide an auto tracking camera. Still further, any equivalent or same function will still fall within the current invention and can be added to the preferred DV devices to provide nice, clear digital data and storage into a memory-means powered by an unlimited power source without causing worry about battery power or bad electric wire installation, unlike the conventional home security equipment.

In embodiments involving a lamp holder, insert means may be provided to connect with an original lamp holder's receiving means to change the lamp holder's current, functions, current type, voltage, and features, such as changing from AC to DC at a certain voltage and amperage, adding cameras and related parts and accessories, adding LED device current triggers, adding IC chips to operate desired functions, adding a tracking motor device, adding a sensor(s), adding remote control parts and accessories, adding an infrared nighttime vision function, adding memory means with related parts and accessories, adding display means, adding transmitter means to transfer digital data to a remote distance, adding auto dialing system, and adding an internet connect function or any other electric or mechanical functions based on market requirements.

The lamp holder may be selected from market-available items, and may hold one or more light means, including any of an incandescent, fluorescent tube, PL, CFL or LED light for use with a variety of different bases, which may be in the form of a screw base, bayonet base, two pin base, twist base, or push and twist base. The lamp holder is connected with the unlimited power source when the lamp holder's insert means is connected with the original lamp holder receiving means so that the power can be obtained from the original lamp holder's unlimited power source.

The camera means incorporated with the lamp holder of this embodiment, like the camera means of any of other embodiments, can consist of desired parts and accessories including lenses, optics means, electric means, mechanical means, circuit means, integrated circuit (IC) means, data delivery means, data storage means, USB means, cable means, microphone means, record means, display means, sensor means, PIR means, IR means, night vision means, flash means, switch means, motion detect means, sound detect means, photo sensor means, motor means, tracking means or other market available parts and accessories to allow people to get digital image, video, and audio data and record it in memory means or send/transmit the data to a communication device, computer device, receiver device, and/or display device to provide predetermined functions, effects, and performance.

According to another preferred embodiment, and LED bulb means includes a plurality of LED-units that fit within a bulb housing having an appropriate shape and dimensions, and positive and negative electric contracts to get power from the power source when the electric-contacts connect with the power source and the power source is thereby connected with the desired electric parts and accessories, which may include circuit means, IC means, conductive means, switch means, sensor means, remote control means, IR means or other electric or mechanical means to cause the LED-unit(s) and the camera means to be activated with the LED bulb and its added parts and accessories displaying the above-mentioned pre-determined function(s) and performance(s).

The LED bulb has space to install the camera means on its housing by using or together with any of the following: joint-means, rotating means, connect-means, spin-means, catch-means, a gear-set, a motor set, control means, IC means, sensor head(s), a tracking assembly, memory assembly means, display means, screen means, USB means, conductive means, digital data delivery means, battery means, rechargeable battery means, power fail means, or other means to provide the camera means built-into the LED Bulb to have desired functions, features, and performance.

The space in the LED bulb may include a pole(s), block(s), piece(s), and/or compartment(s) having properties that cause the bulb or space to be extendable, retractable, foldable, rotatable, and/or transformable so that the related parts and accessories can be installed within.

The camera means may be turned-on and turned-off by sensor means, a PIR sensor head, more than one sensor head(s), remote control means, switch means, motion detection means, vibration detection means, heat sensor means, and/or smoke detector means, so as to take photos, video, and audio and provide colorful, clear, and sharp digital data to be saved in storage means,
shown on a screen, shown on a wireless screen, shown on a monitor(s), or transmitted to a communication device, computer device, Internet device, or auto dialing device.

The LED-units, camera means, sensor means, remote control means, moving LEDs, moving sensor means, moving camera means, motion detection means, heat detection means, smoke detector means, motor means, auto tracking assembly, and so forth can be installed on a fixed housing, moving housing, or extendable housing, so as to provide a desired sensor range, distance, and angle with a variety of selection options for the camera's pixels, focus range, and/or pictures per second, for video/movie and sound/audio upon activation of the camera means to shoot and store the digital data into the memory means, communication device, computer device, consumer electric device, screen, or monitor(s).

Finally, the light device including the Flash light as FIGS. (8A and 8B) has built-in Camera, memory kits, and optional wireless communication device may also take the form of variety of the light source light device selected from market available light devices such as a night light, desk lamp, floor lamp, down light, ceiling light, track light, security light, projection light, outdoor light, indoor light, LED light fixture, LED light bar, LED picture light, LED closet light, LED door light, LED garage light, LED motion sensor light, LED power failure light, LED motion sensor with auto tracking means, LED patio light, or any other LED light device available from the marketplace.

BRIEF DESCRIPTION OF THE DRAWINGS

FIGS. 3A, 3B, 3C, 4A, 4B, and 4C show a third embodiment of the current invention in the form of an LED bulb has built-in DV, memory cards and optional wireless communication device(s).

FIGS. 9A, 9B, 9C, 9D, 9E, and 9F illustrate a size comparison for a traditional LED night light versus a plurality of market-available Digital Video/Camera units and all the DV/Camera which has all kind of light source for illumination powered by DC Power for light device.

DETAILED DESCRIPTION OF THE PREFERRED EMBODIMENTS

Figure 8A:
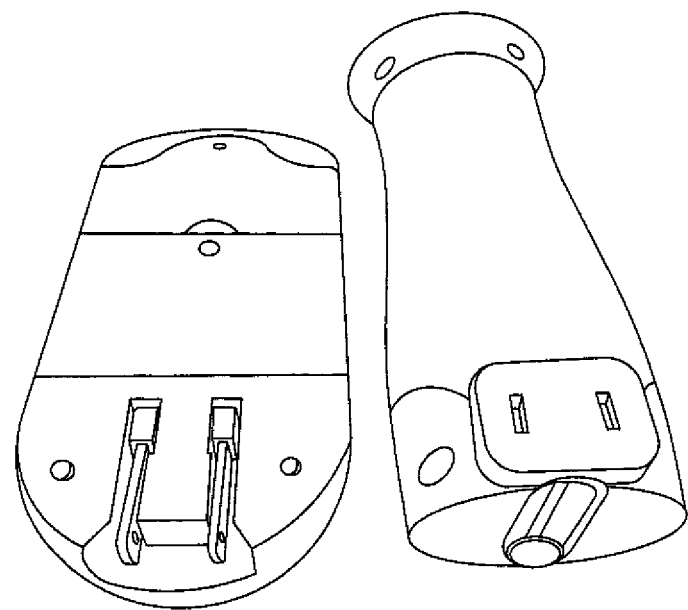
FIGS. 8A and 8B show a foldable or retractable prong means construction and details for Flash light device which has built-in DV, memory cards and optional wireless communication device(s) for security or military or army or police to use with different material and carry design so can easily hold, carry, attached on pocket, helmet, waist or weapons. All the FIG. 8A+FIG. 8B front lens has Flashlight LEDs including all kind market LED or-and LEDs on Board or-and Chip-On-Board (COB) which show on the FIG. 6A and FIG. 6B and FIG. 6C and FIG. 6D which also disclosure center is Camera or Digital Video (DV) as FIG. 1A, FIG. 6C, FIG. 6D. The side has plurality of LEDs or LEDs-on-Board (LOB) same as FIG. 6A and FIG. 6D. The side has plurality LEDs surrounding the center camera or digital video (DV) also can be at least one piece or one of donut or multiple arc-piece of COBs to arrange surrounding the said center camera or digital Video (DV).
Figure 8B:
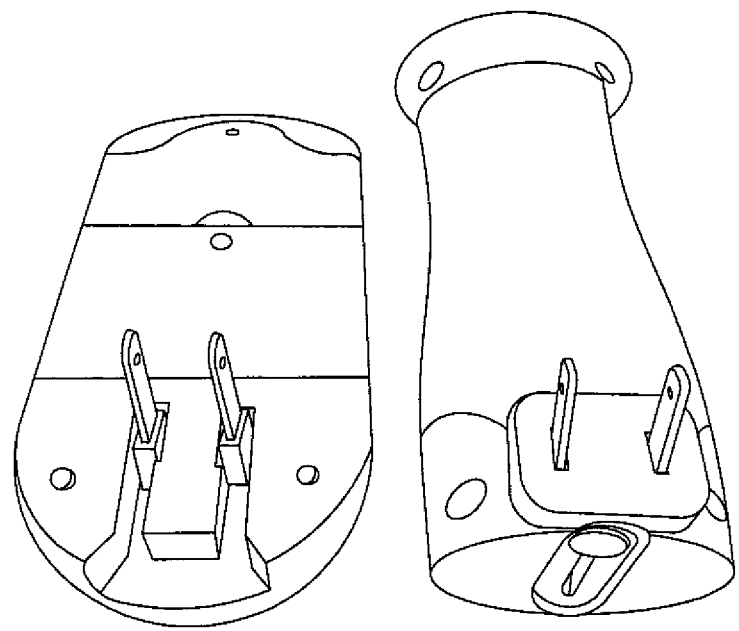
Figure 10A:
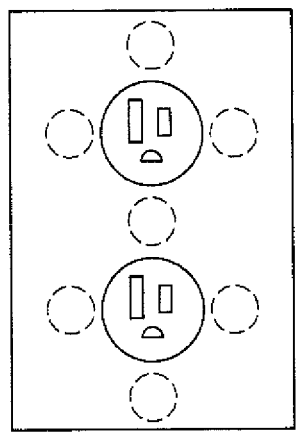
FIGS. 10a and 10b show an embodiment of the current invention which uses a plurality of suction cups to reinforce the prong means and hold a super heavy device on a wall outlet cover plate which is a light device has built-in DV, memory cards and optional wireless communication device(s).
Figure 10B:
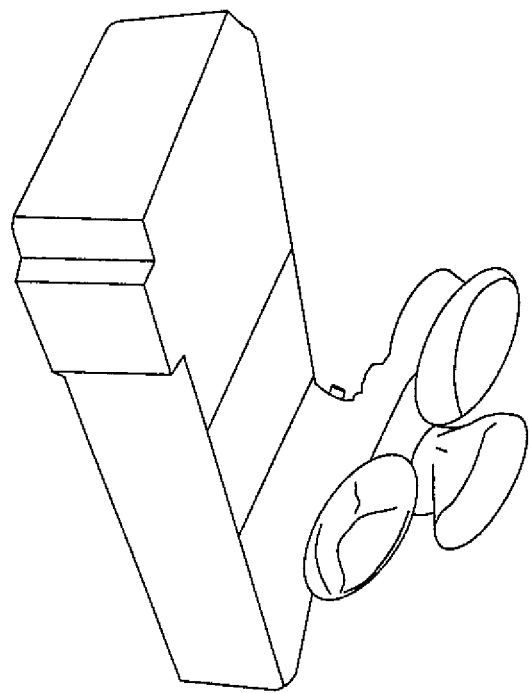

The invention is a device having digital data means that is powered by an AC unlimited or DC Big capacity electricity storage unit power source and built-into a lamp holder (FIG. 1A, 1B, 1C, 2A, 2B), LED bulb (FIG. 3A, 3B, 3C, 3D, 3E) (FIG. 4A, 4B, 4C) (FIG. 6A, 6B, 6C, 6D), or light device (FIG. 5A, 5B, 5C, 5D) (FIG. 7A, 7B, 7C, 7D) (FIG. 9A, 9B, 9C, 9D, 9E, 9F) (FIG. 10A, 10B, 11A, 11B) including the Flash light (FIG. 8A and FIG. 8B). The following description was included as notes in the original drawings, and are now included herein:

FIGS. (1A-1c) show a device in the form of a light fixture insert (3d) with a screw-in base (3b) and a built-in camera head (3f) that can be screwed into an existing light fixture to add digital camera functions, with power being supplied through an elastic terminal at the top of the light fixture insert when the insert is screwed into the existing light fixture. The insert includes a socket (3e) into which a market available all kind of bulb may be screwed to receive power from an unlimited power source through the insert base (3b). A sensor (3c) and IC are provided to control movement of the camera. By replacing a conventional bulb in the existing light fixture with the illustrated insert (3d), a security camera can easily be installed without the need for expert installation. When the bulb is then screwed into the socket, the resulting installation will look like an ordinary light fixture and therefore bad guys will not notice the camera (preferred is hidden or pin-hole size camera for tiny unit). The camera can include night vision or infrared capabilities, and tracking features, and the insert may be waterproof to protect the camera and electronics. The bulb may be an incandescent bulb, or another type of bulb such as an LED bulb or CFL or any other light source bulb.

FIGS. (2A and 2B) show an arrangement similar to that of FIGS. (1A-1C). In the arrangements of FIGS. (2A and 2B), like that of FIGS. (1A-1C), the camera preferably faces downward from a ceiling installation, and the motion sensor or sensor-assembly causes the camera to start recording in response to detection of motion in the field of view. As shown in FIGS. (3A-3C and 4A-4C), the sensors and/or camera can be extended or retracted and rotated to avoid interference by lamp shades, lamp covers, lamp walls, or other blocking means that otherwise might block a field of view of the camera or sensor. The device may have multiple rings, each of which is separately rotatable to enable separate rotation of the sensor(s) and difference camera heads, as shown in FIGS. (3A-3C and 4A-4C). As shown in the LED bulb inside the light device FIG. (3D) and FIGS. (5A-5D), the extension may enable the position, orientation, or angle of the sensor or camera head to be varied, or enable the sensor to be extended while the lighting feature is within a shade, and the device may further include external light elements such as lighting elements (31) and (36), as well as additional sensors such as sensor located inside the extendable tube. As shown in FIGS. (6A-6D), a variety of LED bulbs may be inserted into the light related device.

The Light device has built-in DV and memory kits and optional wireless communication system as FIGS. (7A-7D) show digital video webcam lighting devices with built-in prong means to connect the webcam directly to an unlimited AC power source such as a wall outlet, and sensors that can be used to provide auto tracking functions. It will be appreciated that the video webcam devices are conventional, except that they have been modified to include;
(1) Lighting function
(2) built-in prong means
(3) and/or various night or emergency lighting features.

The webcam device of FIG. (7A) may include an LED (7-1) to serve as a night light as well as a webcam, while the webcam device of FIG. (7B) includes foldable prong means (7-5), a power fail light (7-10) as well as a night light (7-11), switch (7-12), memory card slot (7-13), on/off switch (7-6), camera head (7-9), and USB adaptor (7-7).

The device of FIG. (7C) is a projection night light with foldable prong means (7-18), power switch (7-17), photo/video switch (7-16), indicator LEDs (7-14) and (7-15), camera head (7-20), night light (7-21), power switch (7-22), USB adaptor (7-23), and LED floor light (7-19).

The device of FIG. (7D) is a LED night light with a built-in emergency light function, including foldable prong means (7-24), a memory card and USB adaptor compartment (7-25), a power input (7-26), a camera head (7-27), an LED night light with emergency light function (7-28), an electroluminescent or LED night light area (7-29), a battery compartment (7-30), and a foldable compartment (7-31) for a screen select switch, model selection switch, and setting switch.

The Drawing FIG. 6A, FIG. 6B, FIG. 6C, FIG. 6D→ said while change the bulb-base into the Flashlight energy storage compartment. Those FIGS. 6A+6B+6C+6D the Front Flashlight has built-in camera will apply into the FIG. 8A and FIG. 8B . . . .

From the FIGS. (8a and 8b) show the other light device application for portable or wearable flashlight application as from the FIGS. (8a and 8b) so devices with foldable or extendable prongs. In FIG. 8a, the prongs are folded or retracted and cannot be used, while in FIG. 8b, the prongs are extended for use.

From FIG. (8A)(8B) show the portable Flash light has built-in DV, memory unit, and optional wireless communication such as WiFI, 3G or 4G or future wireless transmitter or receiving kits to offer the police or army or military or security person can have the super bright light source to incorporated built-in DV and memory unit and optional wireless communication to take photos, take video, offer on-line image through the optional wireless communication to the viewers to see the record or on-line or on-air instat live image to make sure the safety and status while people use the flash light. While use for Army or Military purpose the DV or Camera can incorporate with above discussion for night time or dark environment to use the (1) Visible flash light beam to offer brightness or (2) unvisible IR or photo diode to make the dim or dark environment to show the surrounding status and not let enemy see the Visible light beam and shoot the army or military team and persons.

Figure 1A:
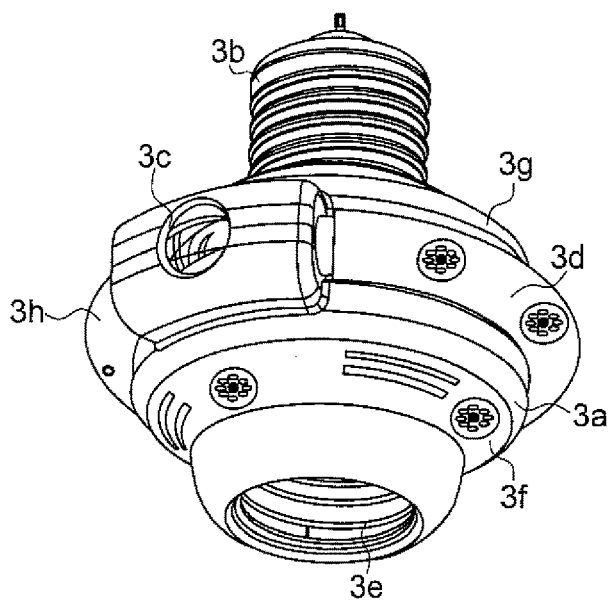
FIGS. 1A, 1B, and 1C show a lamp holder according to a first preferred embodiment of the current invention has built-in DV, memory cards and optional wireless communication device(s).
Figure 1B:
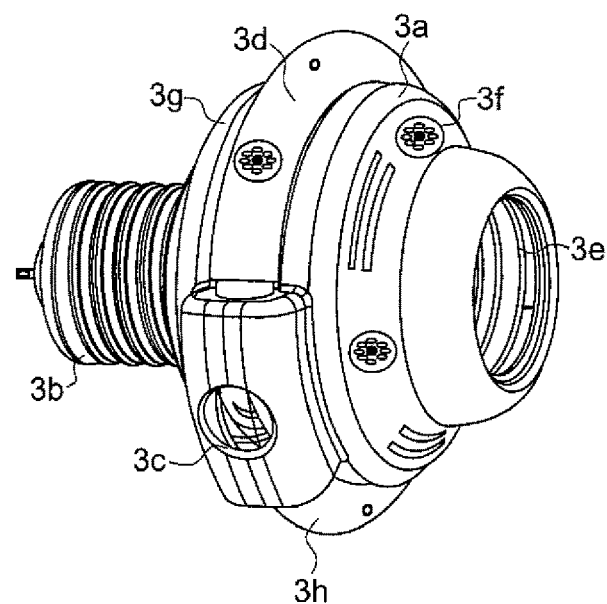
Figure 1C:
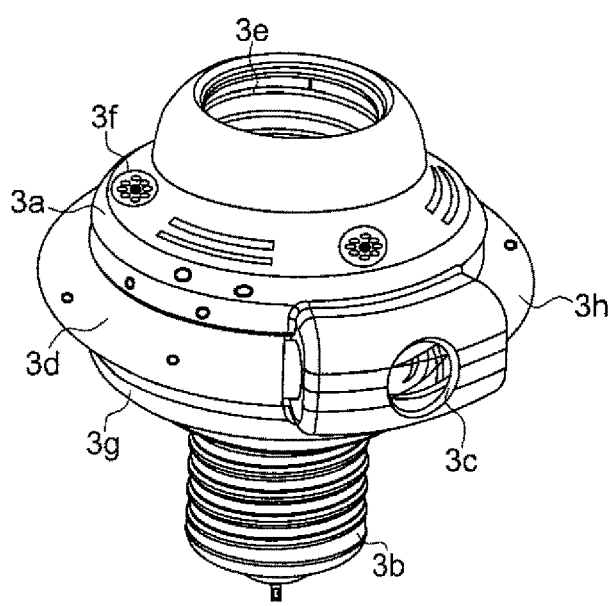
Figure 2A:
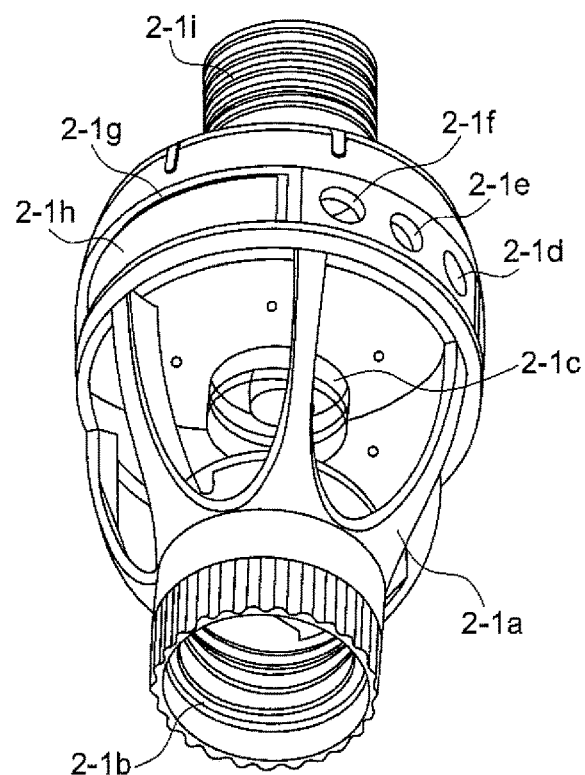
FIGS. 2A and 2B shows a lamp holder of a second preferred embodiment has built-in DV, memory cards and optional wireless communication device(s).
Figure 2B:
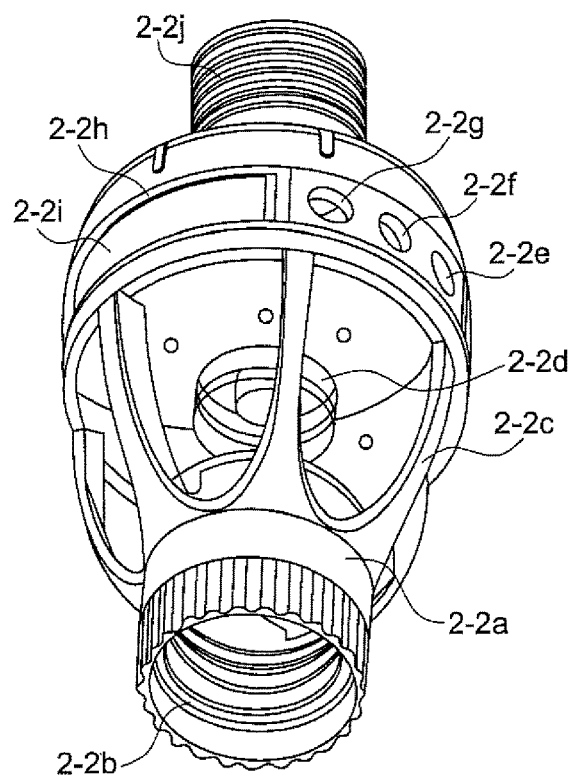
Figure 3D:
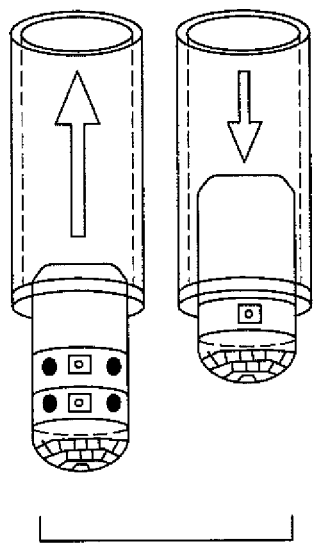
FIGS. 3D and 3E show a fourth preferred embodiment of the current invention, also in the form of an LED bulb has built-in DV, memory cards and optional wireless communication device(s).
Figure 3E:
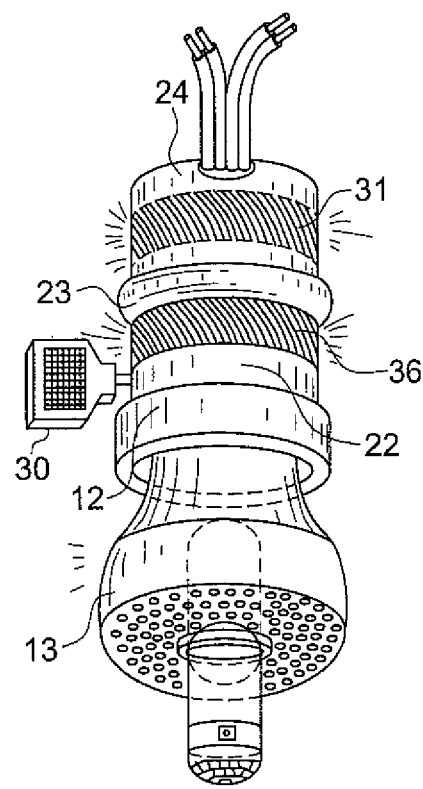
Figure 5A:
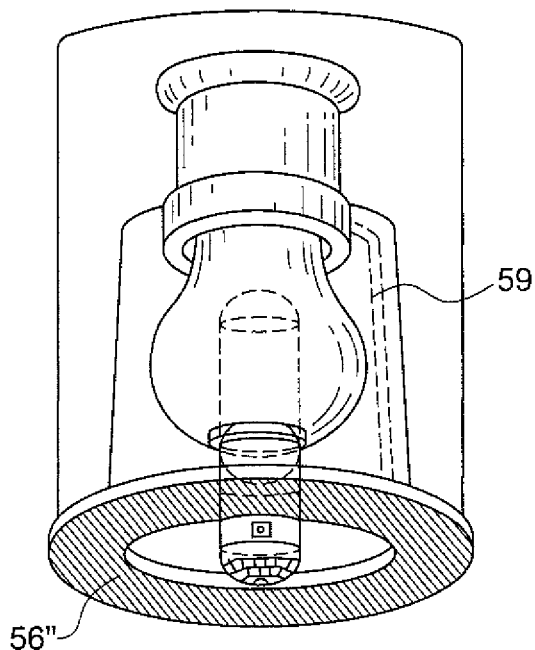
FIGS. 5A 5B, 5C, and 5D show another embodiment of the invention in the form of an light device has current invention's LED bulb has built-in DV, memory cards and optional wireless communication device(s).
Figure 5B:
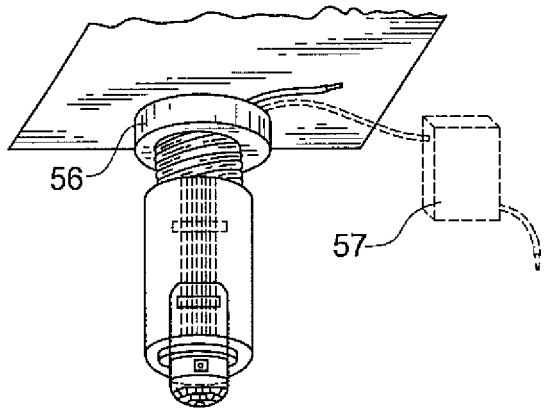
Figure 5C:
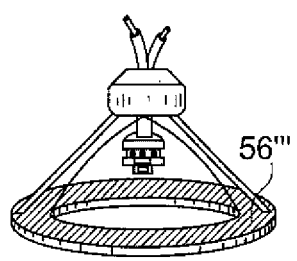
Figure 5D:
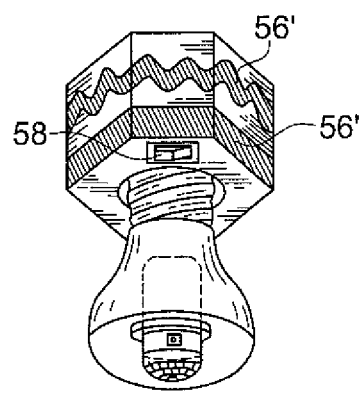
Figure 6A:
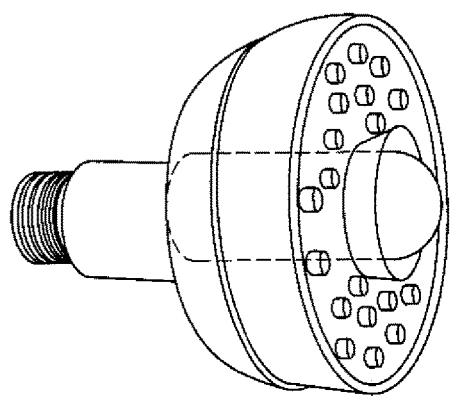
FIGS. 6A, 6B, 6C, 6D show a variety of different LED bulb designs which can have built-in digital data means and be powered by an unlimited power source according to the current invention. The Drawing FIG. 6A, FIG. 6B, FIG. 6C, FIG. 6D→ said while change the bulb-base into the Flashlight energy storage compartment. Those FIGS. 6A+6B+6C+6D the Front Flashlight has built-in camera will apply into the FIG. 8A and FIG. 8B . . . .
Figure 6B:
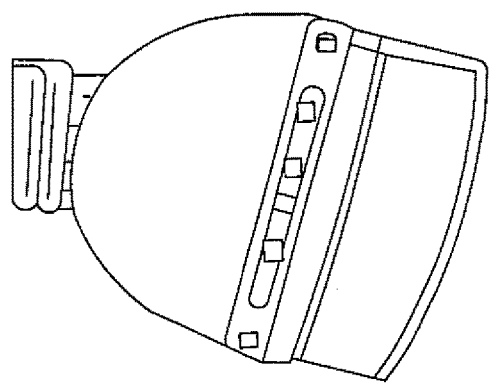
Figure 6C:
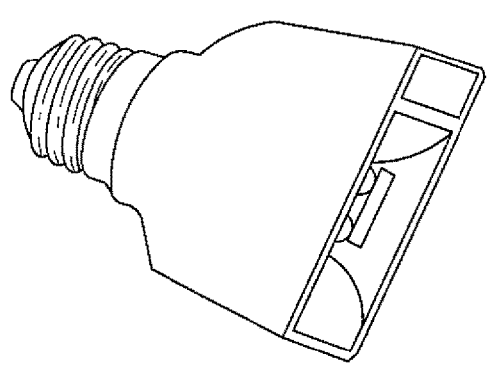
Figure 6D:
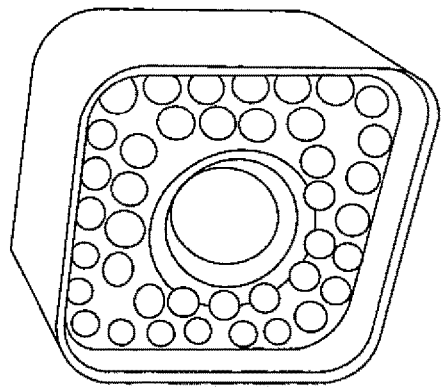
Figure 7A:
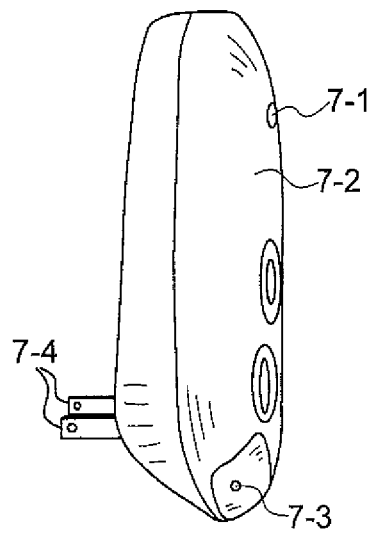
FIGS. 7A, 7B, 7C, and 7D show another embodiment of the current invention in the form of a light device having built-in digital data means and powered by an unlimited power source.
Figure 7B:
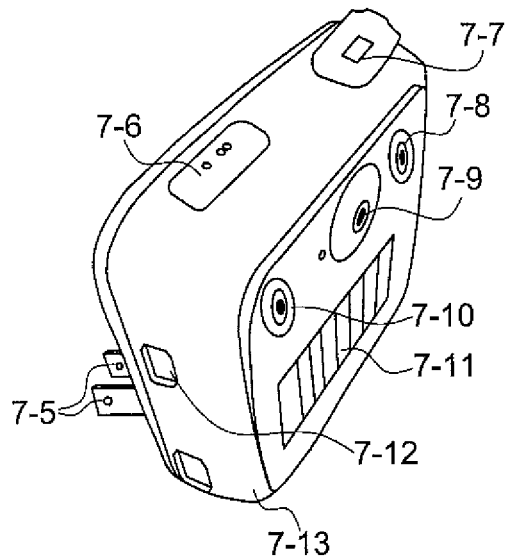
Figure 7C:
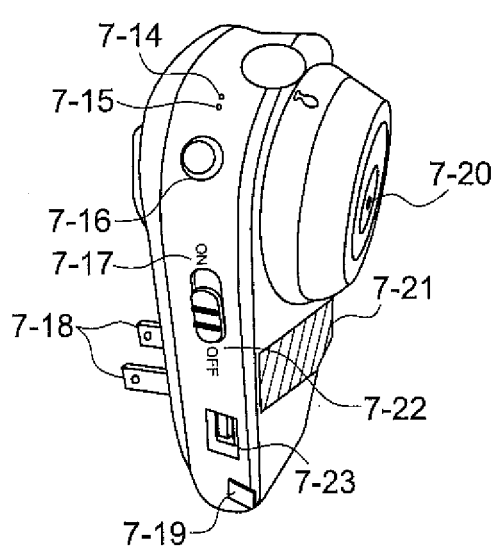
Figure 7D:
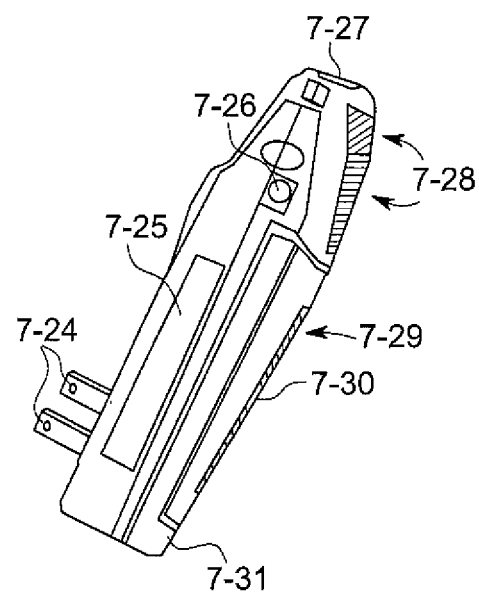

All the FIG. 8A+FIG. 8B front lens has Flashlight LEDs including all kind market LED or-and LEDs on Board or-and Chip-On-Board (COB) which show on the FIG. 6A and FIG. 6B and FIG. 6C and FIG. 6D which also disclosure center is Camera or Digital Video (DV) as FIG. 1A, FIG. 6C, FIG. 6D. The side has plurality of LEDs or LEDs-on-Board (LOB) same as FIG. 6A and FIG. 6D. The side has plurality LEDs surrounding the center camera or digital video (DV) also can be at least one piece or one of donut or multiple arc-piece of COBs to arrange surrounding the said center camera or digital Video (DV)

The flash light offer super good brightness let the DV or camera or IP Cam or driving Cam or WebCam can take nice photos, video, on-line message with colorful image to viewer.

Same for other lighting device did as above discussion. This is offer the portable flashing light or wearable flashlight for people to report or send out image by wireless communication equipment to the phone, computer, screen, communication equipment to report the people status or environment at the dark or evening environment.

This is unique and the power can be DC power source or rechargeable Power source or wireless recharge power source by market available charging or battery storage units with sufficient big capacity of the electricity.

FIG. (9b) shows a typical night light, while FIG. (9b) shows a device with multiple camera heads, which can easily fit within the approximate dimensions of the night light. FIG. (9c) shows a night vision digital video device with a motion sensor that can be upgraded for auto tracking. FIGS. (9e-9f) show extra small and slim digital recording devices that can be incorporated into a lighting device according to the principles of the invention.

Figure 11A:
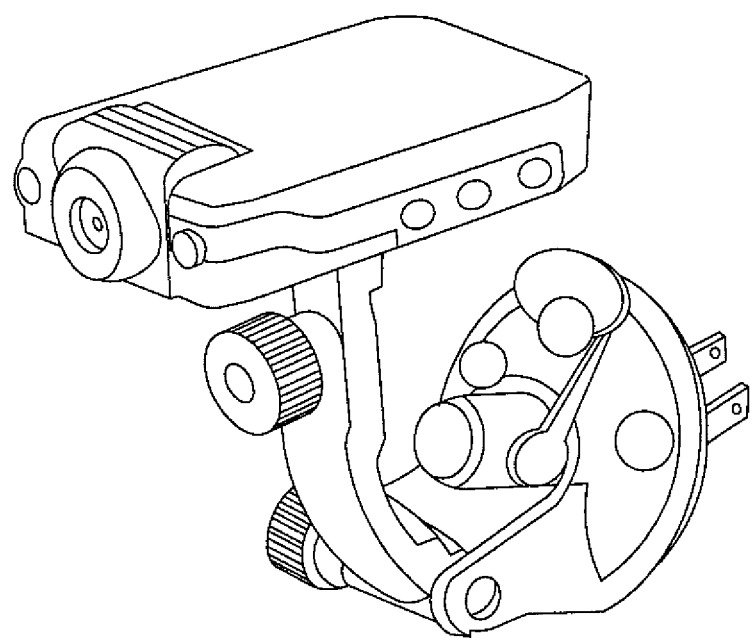
FIGS. 11a and 11b show another embodiment with a plurality of suction cups for light device has built-in DV, memory cards and optional wireless communication device(s).
Figure 11B:
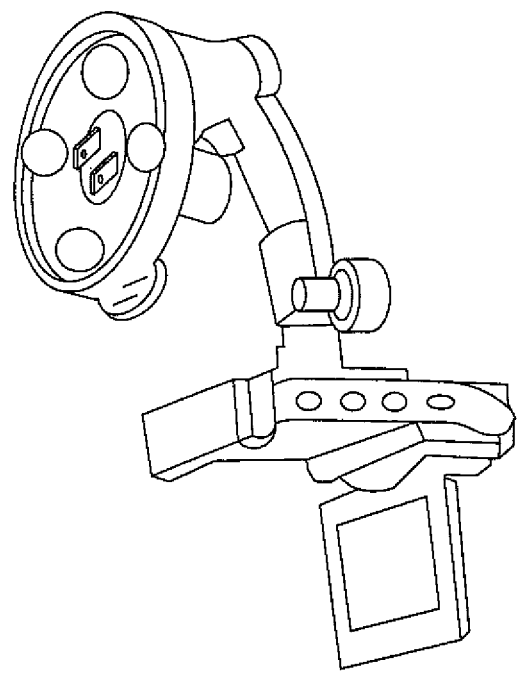

FIG. (10A) show the location where suction cups and where the suction cups will attach on the wall outlet cover plate, shown in FIG. (10B), may be used to adhere to an outlet cover plate and support the extra weight of the combined DV device and lighting fixture when directly plugged into a wall outlet. FIGS. 11A and 11B show alternative DV devices arranged, according to the principles of the invention, to be plugged into a wall outlet and to be supported, as necessary, by additional suction cups.

In summary, the invention provides a light device having a built-in digital data device powered by an AC unlimited power source that supplies unlimited power to the device or DC big capacity of electricity to supplies sufficient power to device, the digital data device including at least one camera having means for capturing images, data, or sound at a desired shooting angle, resolution, color, brightness, and sharpness, and at least one of means for storing the images, data, or sound into a memory and means for transmitting the images, data, or sound to at least one of a communication device, computer device, phone, receiver device, and display device, the digital data device further including at least one of components selected from lenses, optical components, electrical components, mechanical components, circuitry, an integrated circuit (IC), data delivery means, data storage means, a USB port, a cable, a microphone, record means, display means, sensor means, PIR means, IR means, night vision means, flash means, a switch means, motion detect means, sound detect means, a photo sensor, a motor, and tracking means. The light device includes a housing and means for emitting light beams, and is supplied with power from the power source by circuitry including at least one of a controller, switch, sensor, conductors, integrated circuit, remote controller, and wireless communication means, The light device may be selected from a night light, desk lamp, floor lamp, down light, ceiling light, track light, security light, projection light, flashlight, outdoor light, indoor light, LED light fixture, LED light bar, LED picture light, LED closet light, LED door light, LED garage light, The light device including LED motion sensor light, LED power failure light, LED light with auto tracking, LED patio light, and LED light device, and may be connected with the power source by prongs, a conductive wire with a plug extending from the light device, a USB adaptor, a transformer device, and an inductor device.

In a preferred embodiment, as illustrated in FIGS. 1A-1C and 2A-2B, the device is in the form of an insert forming a lamp holder with a socket having desired lamp socket specifications, said insert being arranged to be inserted into an existing light fixture.

Preferably, the light device may have multiple function in addition to a lighting function including portable or hand-carry flashlight or others, and may include a compartment for extendably, retractably, foldably, or transformably installing accessories that provide more than one function.

The light device's digital data means include sensor means having more than one sensor head and an integrated circuit for controlling an auto tracking assembly that enables the camera to track moving objects or persons, and/or may include multiple cameras for capturing images of different locations.

The light device's unlimited AC power source may be an electrical utility power supply system for supplying electricity to homes, residences, and businesses.

The invention for Light device also provides a webcam having an auto tracking means and power supply connected to an unlimited power source to a USB interface, the webcam including at least one camera head having means for capturing images, data, or sound at a desired shooting angle, resolution, color, brightness, and sharpness, a motor, and sensor means for causing the move the camera head to follow a moving object or person, and means for storing or transmitting data captured by the camera head to one of a display, computer, communication device, phone, Internet, website, e-mail, or auto dialing system. The webcam may include a USB adaptor for connection to a computer or communication equipment with a USB port, with the webcam being activated when connected with the power source to carry out predetermined image capture functions and to capture digital data under predetermined environmental conditions.

The Light device's webcam may include suction cups for mounting the webcam to a computer screen or housing, and multiple camera heads for simultaneously viewing multiple areas, as well as a lighting device or devices having additional functions.

The light device's webcam preferably further includes prong means for directly plugging the webcam into an electrical outlet, and weight supporting means for supporting the webcam on the outlet, said weight supporting means including at least one of the following: at least one suction cup, glue, double-sided tape, a hook and loop fastener, an adhesive, a chemical compound, a connector, an adaptor, and a fitting means, and may be arranged to operate at night or in low light.

I claim:

1. A security light having a built-in digital data device Consist of;

At least one power source that supplies power to the digital data device and the said security light, and The said security light including at least one preferred light source selected from group combination of LED or LED-assembly or LEDs-on-Board or LED Chip-On-Board (COB) and at least one of motion or-and moving sensor(s), wherein:

said digital data device includes at least one camera having function for capturing images, data, or sound at a desired shooting angle, distance, resolution, color, brightness, and sharpness, and at least one storing assembly for storing the images, data, or sound into a memory or storage unit or cloud storage station for download or delivery or transmission of the images, data, or sound by communication assembly or transmitter to at least one of a (1) communication device, or-and (2) computer device, or-and (3) phone, or-and (4) receiver device, or-and (5) display device for display or replay or reply or answer of the images, data, or sound through the said digital data device itself built-in control or software or program system the said light device includes a housing and means for emitting visible light beams, and while motion or motion sensor be trigger by moving subjects, and the said light device get power from said power source by circuitry including at least one of a controller, switch, sensor, conductors, integrated circuit, remote controller, and wireless communication system; and said security light is one of (A) a battery-powered light device, or-and (B) an AC-powered hanging light device, or-and (C) an AC-powered plug-in light device, and a security light having at least one of additional function select from;

(1) digital data storage into memory card and can display, replay, reply, (2) digital datadownload into communication device(s) by Bluetooth or communication system or download into other electric displayer or replay or reply, (3) the digital data can use wireless communication assembly or system to send out message, data, alert, words, emails, line, skype, what's APP, sound, image to variety of market communication devices including mobile phone, computer, monitor or have multiple-ways communication through wireless network, 3G or 4G or update wireless network, WIFI, Router to communicate with the said security light while incorporate with related software so can remote control camera angle, position, orientation and talking through security light unit, (4) the security light has more than one functions; and said security light device is connected with the power source by one of (aa) prongs, (bb) conductive or-and USB wire, (cc) a conductive wire with a plug extending from the light device, (dd) a USB port(s) or adaptor, (ee) an outside or a built-in transformer device, and (ff) an inductor device for wireless charging inner energy storage unit(s) or power kits.

2. A security light as claimed in claim 1, wherein said security light is a lamp-holder construction includes an insert forming a lamp holder with a socket desired, said insert being arranged to be inserted into an existing light fixture or light source(s).

3. A Light security light as claimed in claim 1, wherein said light device has at least one non-lighting function in addition to a lighting function.

4. A security light as claimed in claim 1, wherein the light device includes a compartment for extendably, retractably, foldably, or transformably installing accessories that provide said at least one non-lighting function or-and can use wireless communication to make setting, multiple-sides communications, control, conversation, adjust angle, focus, brightness, signal, or other functions by wireless technical including hardware or-and software including APP or other update software by update wifi, 3G, 4G or future wireless system.

5. A security light as claimed in claim 1, wherein said digital data system or device include sensor having more than one sensor head and an integrated circuit for controlling pre-determined functions, or-and create an auto tracking system or assembly that enables the camera to track moving objects or persons.

6. A security light as claimed in claim 1, wherein said device includes multiple cameras for capturing images of different locations.

7. A security light as claimed in claim 1, wherein said power source is an electrical utility power supply system for supplying electricity to homes, residences, and businesses.

8. A flashlight having a built-in digital data device powered by an AC or DC or Both AC unlimited or DC big capacity electricity power source that supplies sufficient power to the device for long time illumination and functions, said flashlight including a light device for people carry, wearing, hold, hand carry, wherein:

said digital data device includes at least one camera having capturing images, data, or sound at a desired shooting angle, distance, resolution, color, brightness, and sharpness, and at least one of functions for storing the images, data, or sound into a memory or storage unit or-and cloud storage device, and which incorporate with other or own device's circuitry for delivering or-and transmitting shown or display or replay or reply or multiple-ways communication the said digital data including images, data, or sound, and The said flashlight also has software including APP, or other pre-programed software through wifi, or Bluetooth, or wireless communication to make setting, control, program, transmitting, adjustable at least for the said camera angle, distance, focus, image, take photo, take video, send digital data to desired receiver to at least one of a communication device, computer device, phone, receiver device, and display device, or the device itself, said digital data device further includes desired components selected from lenses, optical components, electrical components, mechanical components, circuitry, an integrated circuit (IC), data delivery kits, data storage device, a USB port, a cable, a microphone, record device, displayer, sensor, PIR kits, IR assembly, night vision kits, flasher, a switch, motion detect, sound detect, a photo sensor, a motor, and tracking device, and said flashlight device includes a housing and control-circuit for emitting light beams, said flashlight device and its camera or-and DV related parts & accessories supplied with power from said power source by circuitry including at least one of a controller, switch, sensor, conductors, integrated circuit, remote controller, and wireless communication assembly, and said the flashlight light device further is DC power products has built-in energy storage units which selected from (1) non-rechargeable type, or (2) a rechargeable type, or (3) energy storage unit be charged by Solar power or-and Wind power or-and outside or built-in AC-to-DC circuitry or-and USB power source, The said flashlight may be part or be install within of the other products may selected from group combination selected from night light, security light, projection light, outdoor light, indoor light, LED motion sensor light, LED power failure light, LED light with auto tracking, and said the other product or other light device is connected with the power source by one of prongs, conductive wire, a conductive wire with a plug extending from the light device, a USB adaptor, a transformer device, and an inductor device for wireless charging system.

9. A flashlight Light as claimed in claim 8, wherein said device for night time or dark environment use for clear image by (1) visible light beam from Flashlight light source (2) non-vision night vision help means by IR or photo diode with IC controller to make image become super bright image.

10. A flashlight Li-gflt-as claimed in claim 8, wherein said light device has multiple function in addition to a lighting function.

11. A flashlight Li-gflt-as claimed in claim 8, wherein the light device includes a compartment for extendably, retractably, foldably, or transformably installing accessories that provide more than one function and can use wireless communication to make setting, multiple-sides communications, control, conversation, adjust angle, focus, brightness, signal, or other functions by wireless technical including hardware or software including APP or other update software by update wifi, 3G, 4G or future wireless system.

12. A flashlight Light-as claimed in claim 8, wherein said digital data means include sensor means having more than one sensor head and an integrated circuit for controlling an auto tracking assembly that enables the camera to track moving objects or persons.

13. A flashlight Light as claimed in claim 8, wherein said device includes multiple cameras for capturing images of different locations.

14. A flashlight bi-ght-as claimed in claim 8, wherein said AC unlimited power source is an electrical utility power supply system for supplying electricity to homes, residences, and businesses to charge the said energy storage unit including rechargeable batteries.

15. A flashlight having a built-in digital data device consist of;

The said flashlight is powered by an AC or DC or Both AC unlimited or DC big capacity electricity power source that supplies sufficient power to the device for long time illumination and functions, said flashlight including a light device for people carry, wearing, hold, hand carry, wherein:

said digital data device includes at least one camera having capturing images, data, or sound at a desired shooting angle, distance, resolution, color, brightness, and sharpness, and at least one of functions for storing the images, data, or sound into a memory or storage unit or-and cloud storage device, and which incorporate with other or own device's circuitry for delivering or-and transmitting shown or display or replay or reply or multiple-ways communication the said digital data including images, data, or sound.

16. A flashlight having a built-in digital data device as claim 15,

The said flashlight also has software including APP, or other pre-programed software through wifi, or Bluetooth, or wireless communication to make setting, control, program, transmitting, adjustable at least for the said camera angle, distance, focus, image, take photo, take video, send digital data to desired receiver to at least one of a communication device, computer device, phone, receiver device, and display device, or the device itself.

17. A flashlight having a built-in digital data device as claim 15,

The said flashlight or the said digital data device further includes desired components selected from lenses, optical components, electrical components, mechanical components, circuitry, an integrated circuit (IC), data delivery kits, data storage device, a USB port, a cable, a microphone, record device, displayer, sensor, PIR kits, IR assembly, night vision kits, flasher, a switch, motion detect, sound detect, a photo sensor, a motor, and tracking device.

18. A flashlight having a built-in digital data device as claim 15,

The said flashlight device includes a housing and control-circuit for emitting light beams, said flashlight device and its camera or-and digital video has related parts & accessories including at least one of a circuit, controller, switch, sensor, conductors, integrated circuit, remote controller, and wireless communication assembly.

19. A flashlight having a built-in digital data device as claim 15,

The said the flashlight light device further is DC power products has built-in energy storage units which selected from (1) non-rechargeable type, or (2) a rechargeable type, or (3) energy storage unit be charged by (a) Solar power or-and (b) Wind power or-and (c) outside or-and (d) built-in or outside AC-to-DC circuitry or-and (e) USB wire through built-in USB power to get power from power source or-and (f) plug-in prong.

20. A flashlight having a built-in digital data device as claim 15,

The said flashlight may be part or be install within of the other products may selected from group combination selected from night light, security light, projection light, outdoor light, indoor light, LED motion sensor light, LED power failure light, LED light with auto tracking, and said the other product or other light device is connected with the power source by one of prongs, conductive wire, a conductive wire with a plug extending from the light device, a USB adaptor, a transformer device, and an inductor device for wireless charging system.

\* \* \* \* \*